United States Patent [19]

Kakimoto

[11] Patent Number: 4,483,521
[45] Date of Patent: Nov. 20, 1984

[54] RUBBER AND FLUID TYPE VIBRATION DAMPER

[75] Inventor: Toshihiko Kakimoto, Tokyo, Japan

[73] Assignee: Nissan Motor Company, Limited, Yokohama, Japan

[21] Appl. No.: 380,355

[22] Filed: May 20, 1982

[30] Foreign Application Priority Data

Jul. 1, 1981 [JP] Japan .................................. 56-103520
Oct. 1, 1981 [JP] Japan ........................... 56-146222[U]

[51] Int. Cl.³ .......................... F16F 1/36; F16F 9/10; B60K 5/12
[52] U.S. Cl. .................................... 267/8 R; 248/562; 267/140.1
[58] Field of Search ............ 267/8 R, 35, 63 R, 64.15, 267/113, 122, 140.1, 141, 153; 248/562, 566, 634, 636, 638; 188/266, 280, 281, 317, 320; 138/39, 40, 42

[56] References Cited

U.S. PATENT DOCUMENTS

| 2,316,924 | 4/1943 | Whisler, Jr. | 188/317 |
|---|---|---|---|
| 2,387,066 | 10/1945 | Harding | 267/122 |
| 3,220,517 | 11/1965 | Lorenz | 188/318 |
| 3,743,222 | 7/1973 | Smith | 188/317 |
| 4,159,091 | 6/1979 | Le Salver et al. | 248/562 |
| 4,307,653 | 12/1981 | Goes et al. | 188/281 |
| 4,383,679 | 5/1983 | Kakimoto | 267/8 R |
| 4,437,653 | 3/1984 | Kakimoto | 267/140.1 |

FOREIGN PATENT DOCUMENTS

| 731487 | 4/1966 | Canada | 267/64.15 |
|---|---|---|---|
| 0027751 | 4/1981 | European Pat. Off. . | |
| 0038062 | 10/1981 | European Pat. Off. . | |
| 0040290 | 11/1981 | European Pat. Off. . | |
| 2604467 | 8/1976 | Fed. Rep. of Germany | 267/64.15 |
| 1549300 | 11/1968 | France . | |
| 366578 | 1/1939 | Italy | 267/64.15 |
| 484737 | 9/1953 | Italy | 188/320 |
| 55-149436A | 11/1980 | Japan | 267/63 R |
| 2041485 | 9/1980 | United Kingdom . | |
| 2041486 | 9/1980 | United Kingdom . | |

Primary Examiner—Douglas C. Butler
Assistant Examiner—R. R. Diefendorf
Attorney, Agent, or Firm—Lane, Aitken and Kananen

[57] ABSTRACT

A vibration damper of viscous damping type for damping low-frequency (10 to 20 Hz) vibrations has at least one subpassageway oblique to the axis of a main passageway. Since vortexes are generated around the main passageway as damping fluid passes through the subpassageway, the fluid can effectively reciprocate through the main passageway in response to pressure gradients induced by the vortexes, thus increasing the damping force generated as the fluid flows through the main passageway. Further, since the frequency at which the maximum flow rate, that is, the maximum damping factor can be obtained is determined on the basis of the dimensions of a passageway, the dimensions of the main passageway and the subpassageway are selected so as to match the maximum-flow-rate frequency of the subpassageway with that of the main passageway.

8 Claims, 16 Drawing Figures

RUBBER AND FLUID TYPE VIBRATION DAMPER

BACKGROUND OF THE INVENTION

1. Field of the Invention

The present invention relates generally to a vibration damper including viscously-damping fluid therewithin and disposed between a vibrating member and a vibrated member in order to damp vibration energy, and more specifically to passageways, formed in a partition which divides the fluid chamber into a larger region and a small region, through which the damping fluid passes when relatively low frequency vibrations are transmitted to the damper.

2. Description of the Prior Art

The background of the present invention will be explained with respect to its application to an engine mounting device used for an automotive vehicle.

Recently, vibration dampers of viscous-damping type have often been used as engine mounting devices for automotive vehicles. In this case, the engine mounting device is disposed between a power unit such as an engine and a vehicle body in order to prevent relatively high-frequency vibrations generated by the engine from being transmitted to the vehicle body and simultaneously to prevent relatively low-frequency vibrations generated by the vehicle body from being transmitted to the engine. The low-frequency vibrations (10 to 20 Hz) are usually generated as a vehicle travels along a road, that is, while the wheels of the vehicle vibrate on road surfaces. In the vibration damper of this type, it is very important to effectively damp the relatively low frequency vibrations generated from the vehicle body, because, if not effectively damped, engine vibrations may be reinforced by the low-frequency vehicle body vibrations.

In the vibration damper described above, the high-frequency vibrations generated when pistons move up and down are usually damped by the elastic material housing forming the vibration damper body, while the low-frequency vibrations generated when the vehicle travels along a road are usually damped by a damping force generated as the viscous fluid flows through a passageway formed in the partition.

In order to effectively damp the high-frequency vibrations, the softest-possible material should be used for the elastic member so that its resonant frequency will be well out of the range of the high frequency vibrations generated by the engine. On the other hand, in order to effectively damp the low-frequency vibrations, the loss factor of the low-frequency vibration system should be increased; that is, the damping fluid should pass through the passageway as easily as possible. Therefore, it is possible to consider that the loss factor of the low-frequency vibration system is roughly proportional to the flow rate of the damping fluid through the passageway.

Although it may be difficult to simply consider the reciprocation of the damping fluid flowing through the passageway as a low-frequency linear vibration system, if assumed so, the diameter of the passageway should be so determined that the resonant frequency of the low-frequency vibration system matches the low-frequency vibrations generated by the vehicle body. On the other hand, since the damping coefficient of the passageway changes according to the diameter of the passageway, it is usually difficult to adapt the diameter of the passageway for an appropriate resonant frequency and with a relatively large damping coefficient. In more detail, if the passagway diameter is increased in order to increase the damping coefficient, the resulting resonant frequency is also increased so that it will no longer match the low frequency vibrations generated by the vehicle body.

Furthermore, if the fluid does not reciprocate through the passageway smoothly or at a high low rate, since the elastic member is made of soft material, the damper itself will deform and thus the damping function will not be effectively utilized.

The shortcomings of a prior-art vibration damper will be described in more detail hereinafter with reference to the attached drawings under Detailed Description of the Preferred Embodiments.

SUMMARY OF THE INVENTION

With these problems in mind, therefore, it is the primary object of the present invention to provide a vibration damper which can effectively damp low-frequency vibrations generated by the vehicle body.

To achieve the above-mentioned object, the vibration damper according to the present invention comprises a center member in which at least one subpassageway is formed obliquely with respect to the axial direction of the main passageway, in order to produce vortexes around the main passageway. Since vacuum pressure is induced by the vortexes, it is possible to increase the flow of fluid through the main passageway in order to smoothly balance the pressure difference between the large and small chambers, without distorting the elastic member.

Furthermore, since the dimensions of the main passageway and the subpassageway are so determined that the maximum flow rate through the main passageway and the maximum flow rate through the subpassageway are obtained at roughly the same low-frequency range, it is possible to more effectively damp the low frequency vibrations.

BRIEF DESCRIPTION OF THE DRAWINGS

The features and advantages of the vibration damper according to the present invention over the prior-art vibration damper will be more clearly appreciated from the following description of the preferred embodiment of the invention taken in conjunction with the accompanying drawings in which like reference numerals designate the same or similar elements or sections throughout the figures and in which:

FIG. 3(B)-1 is a cross-sectional view of another exemplary center member used with the first embodiment shown in FIG. 3(A);

FIG. 3(B)-2 is a bottom view of the center member of FIG. 3(B)-1;

FIG. 3(C)-1 is a cross-sectional view of other exemplary center member used with the first embodiment shown in FIG. 3(A);

FIG. 3(C)-2 is a bottom view of the center member of FIG. 3(C)-1;

FIG. 4(B)-1 is a top view of another exemplary center member used with the second embodiment shown in FIG. 4(A);

FIG. 4(B)-2 is a cross-sectional view of the center member of FIG. 4(B)-1;

FIG. 4(C)-1 is a top view of another exemplary center member used with the second embodiment shown in FIG. 4(A);

FIG. 4(C)-2 is a cross-sectional view of the center member of FIG. 4(C)-1;

DETAILED DESCRIPTION OF THE PREFERRED EMBODIMENTS

To facilitate understanding of the present invention, a brief reference will be made to a prior-art vibration damper used for mounting an engine with reference to the attached drawings.

Figure 1:
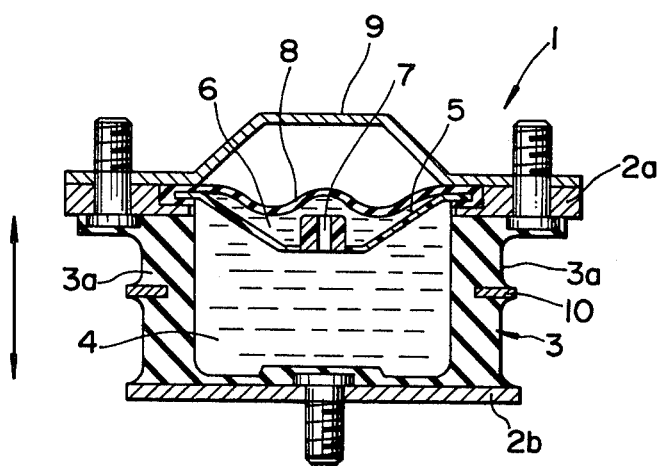
FIG. 1 is a cross-sectional view of an exemplary prior-art vibration damper used for mounting an engine for an automotive vehicle.

With reference to FIG. 1, a prior-art vibration damper 1 comprises two independent frames 2a and 2b, one of which is fixed to a power unit such as an engine (not shown) and the other of which is fixed to a vehicle body (not shown), a cup-shaped elastic member (housing) 3 sandwiched between the two frames 2a and 2b, and a diaphragm 8 disposed so as to cover the open end of the elastic member 3. A fluid chamber defined by the elastic member 3 and the diaphragm 8 is filled with a damping fluid. A partition 5 is disposed within the fluid chamber so as to define a large fluid chamber 4 and a small fluid chamber 6. The large and small fluid chambers 4 and 6 communicate through a passageway 7 formed in the partition 5. The reference numeral 9 denotes a protection cover.

In this vibration damper, high-frequency, small-amplitude vibrations generated mainly by the engine are damped due to elastic deformation of the elastic member 3; low-frequency, large-amplitude vibrations generated mainly by the vehicle body are damped by the damping force produced as the fluid passes through the passageway 7 between the large and small fluid chambers 4 and 6 when the elastic member 3 deforms, that is, when the volume of the fluid chamber 4 varies.

In the prior-art vibration damper as described above, however, since the passageway 7 is formed in the axial direction of the elastic member 3 and the diameter of the passageway 7 is relatively small, the hydraulic resistance effected when the fluid flows through the passageway 7 is relatively large, with the result that it is usually very difficult to smoothly transfer the fluid from the large fluid chamber 4 to the small fluid chamber 6 or vice versa in order to eliminate the difference in pressure between the two.

In more detail, in the case where the vehicle body vibrates at relatively low frequencies and the two frames 2a and 2b deform in the axial direction of the elastic member 3, as shown by the arrow in FIG. 1, in compression mode, the fluid within the large fluid chamber 4 is compressed, so that the pressure of fluid pushes the elastic member 3 outwardly. Since the elastic member 3 is made of a soft material, the side walls 3a of the elastic member 3 expand easily, so that the pressure within the large fluid chamber is reduced without transfer of fluid from the large fluid chamber 4 to the small fluid chamber 6, that is, without producing the damping force due to fluid flow through the passageway 7.

In the case where the vehicle body vibrates at relatively low frequencies and the two frames 2a and 2b deform in the direction of the arrow in FIG. 1 in an extension mode, the pressure within the large fluid chamber 4 drops below normal (negative gauge pressure). Since the elastic member 3 is made of a soft material, the side walls 3a of the elastic member 3 contract easily, so that the pressure within the large fluid chamber is equalized without transfer of fluid from the small fluid chamber 6 to the large fluid chamber 4, that is, without producing the damping force due to fluid flow through the passageway 7. Therefore, in the prior-art vibration damper, low-frequency vibrations are readily transmitted to the engine.

Further, in FIG. 1, reference numeral 10 denotes an annular plate to prevent the side wall 3a of the elastic member 3 from being deformed excessively; even so, it is impossible to prevent deformation of the elastic member completely.

It is very easy to simply increase the diameter of passageway 7 in order to ensure realization of the damping force due to fluid flow through the passageway. However, in this case, the damping force will be maximized at a frequency higher than the low-frequency range of 10 to 20 Hz within which the vehicle body usually vibrates. The reason for this will be described hereinbelow.

In order to effectively damp the high-frequency engine vibrations, a softest-possible material is used for the elastic member; that is, the resonant frequency of the vibration damper is chosen to be well out of the range of the high-frequency engine vibration toward the low frequency side.

On the other hand, in order to effectively damp the low-frequency (10 to 20 Hz) vehicle body vibrations, the loss factor of the low-frequency vibration system should be increased; that is, the damping fluid should reciprocate through the passageway as easily as possible.

If the fluid-passageway system is assumed to be a low-frequency linear vibration system, the flow rate of the fluid through the passageway 7, that is, the loss factor of the low-frequency vibration system, can be roughly expressed as follows:

Loss factor = tan $\delta$ = 1/Q = cw/k where $\delta$ is phase difference between the external force and the vibration system; Q is the quality factor; c is the damping coefficient, mainly determined by passageway diameter; w is the angular velocity (10 to 20 Hz); k is the equivalent spring modulus.

In the above expression, as the passageway diameter increases, the damping coefficient c also increases and, therefore, the loss factor also increases. However, in this case, since the equivalent spring modulus k also increases, the point at which the maximum flow rate is obtained (the resonant frequency) will also increase to over 20 Hz. (Although mass m as represented by the viscocity of the fluid also effects the resonant frequency in relation to spring modulus k, this is considered to be a constant herein).

Figure 2:
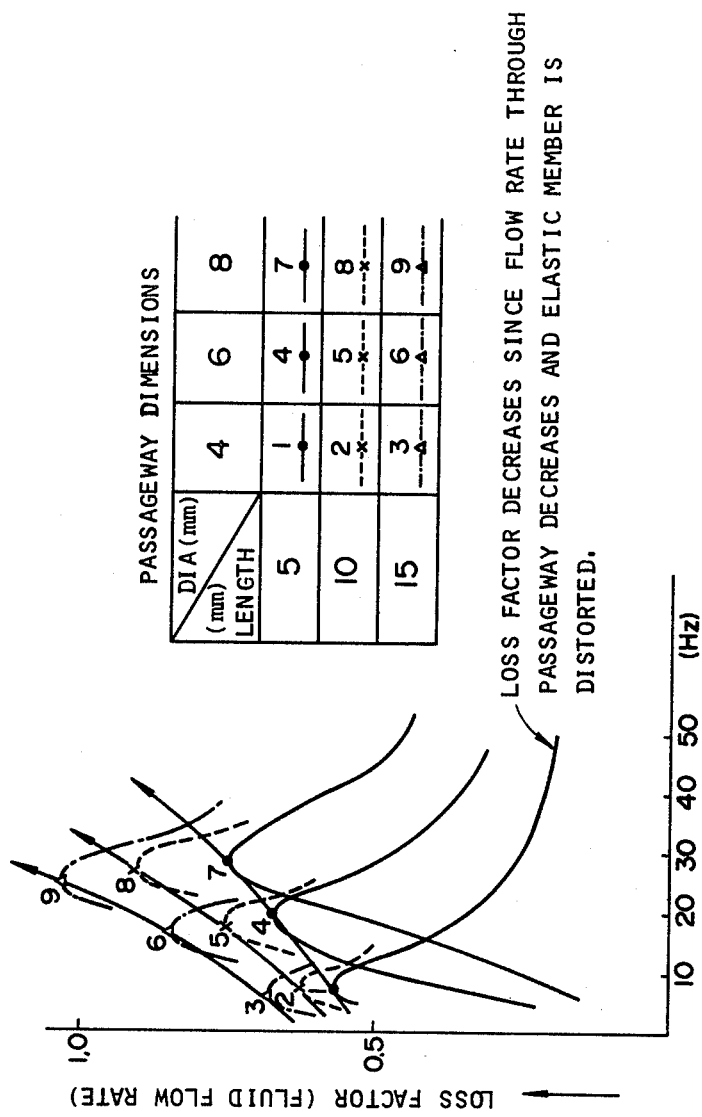
FIG. 2 is a graphical representation of the flow rate of the damping fluid with respect to frequencies of vibrations applied to the vibration damper, in which the parameters are the dimensions (diameter and length) of a main passageway formed therewithin.

FIG. 2 depicts the relationship of loss factor to vibration frequency as passageway dimensions change. This figure indicates that:

(1) as the passageway diameter increases with the passageway length held constant, the loss factor increases, but the frequency at which the maximum loss factor is obtained also increases;

(2) as the passageway length increases with the passageway diameter held constant, the loss factor increases, but the frequency at which the maximum loss factor is obtained decreases slightly;

(3) since the frequency of vibrations generated by the vehicle body ranges from 10 to 20 Hz, the diameter of the passageway should range from 4 to 6 mm, and the length of the passageway should range from 5 to 15 mm.

In view of the above description, reference is now made to a first embodiment of the vibration damper according to the present invention.

Figure 3A:
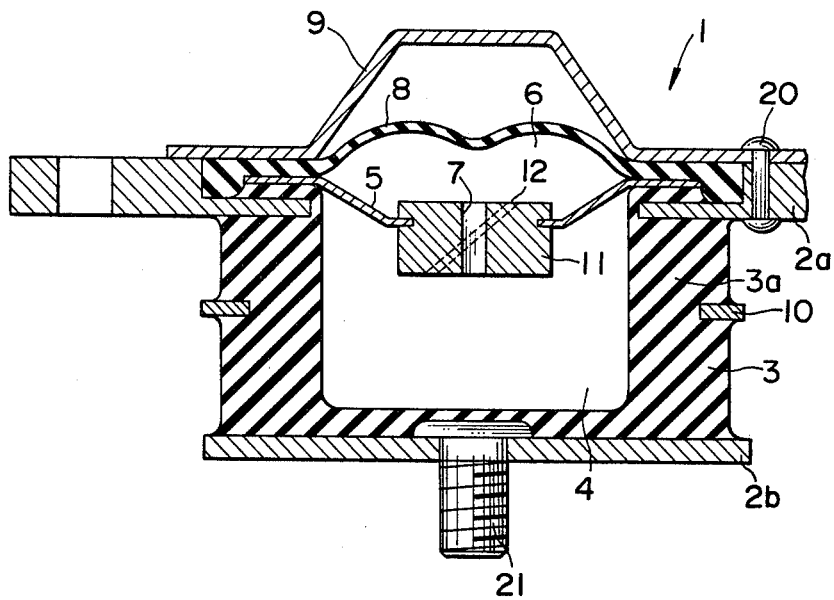
FIG. 3(A) is a cross-sectional view of a first embodiment of the vibration damper according to the present invention.

In FIG. 3(A), the reference numeral 1 denotes a vibration damper; the numerals 2a and 2b denote two independently-supported frames, one (upper) 2a of which is fixed to an engine (not shown) by an engine mounting bolt 20 and the other (lower) 2b of which is fixed to an automotive vehicle body (not shown) by a stud bolt 21. In this embodiment, when high-frequency vibrations are to be damped, the engine will be considered to be the vibrating element and the vehicle body to be the vibrated element; when low-frequency vibrations are to be damped, the vehicle body will be considered to be the vibrating element and the engine to be the vibrated element. The reference numeral 3 denotes an elastic member (or housing) made of, for instance, rubber and disposed between the two frames 2a and 2b. The elastic member 3 is fixed to the frames 2a and 2b by a bonding agent or by vulcanization. The reference numeral 5 denotes a dish-shaped partition, the numeral 8 denotes a diaphragm, and the numeral 9 denotes a rigid cover. The elastic member 3 and the partition 5 define a large fluid chamber 4; the diaphragm 8 and the partition 5 define a small fluid chamber 6. The reference numeral 11 denotes a central member disposed at the center of the partition 5 having a main passageway 7 at the center thereof, and the reference numeral 10 denotes an annular restriction plate for preventing the side wall 3a of the elastic member 3 from being deformed excessively.

These large and small fluid chambers 4 and 6 are filled with a fluid suitable for viscous damping. Further, the cover 9 is fixed to the frame 2a with the peripheries of the partition 5 and the diaphragm 8 sandwiched between the cover 9 and the frame 2a.

In this embodiment, there is additionally at least one subpassageway 12 in the central member 11 oblique with respect to the axis of the main passageway 7, which penetrates the central member from one (top) surface to the other (bottom) surface. In this embodiment, it is preferable to have a pair of subpassageways roughly radially symmetrical with respect to the center of the main passageway 7.

Figures 1, 3B:
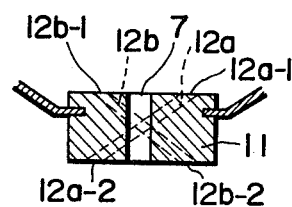

FIGS. 3(B)-1 and -2 show an exemplary arrangement of the subpassageways 12a and 12b, in which two passageways penetrate the central member 11 from bottom to top thereof in such a way that the passageways are oblique to the axis of the central member 11 and are arranged radially symmetrically with respect to the center of the main passageway 7 on the plane perpendicular to the axis.

Figures 1, 3C:
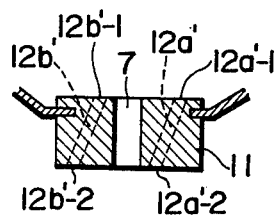
Figures 2, 3B:
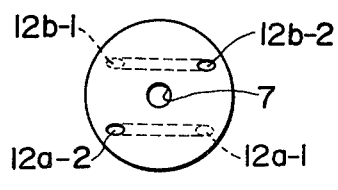
Figures 2, 3C:
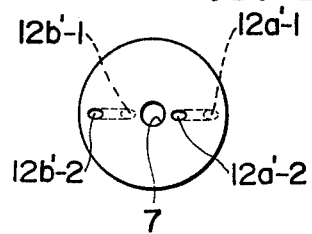

FIG. 3(C)-1 and -2 show another exemplary arrangement of the subpassageways 12a and 12b, in which two passageways penetrate the central member 11 from bottom to top thereof in such a way that the passageways are oblique to the axis of the central member 11, diametrically opposed, and parallel to each other on the plane perpendicular to the axis.

In the first embodiment of the vibration damper according to the present invention, in the case where low-frequency vibrations are generated by the vehicle body so that the two frames 2a and 2b move in the direction of the axis of the elastic member 3 in compression mode, the fluid within the large fluid chamber 4 is compressed, so that the pressure within the large fluid chamber 4 rises and therefore pushes the elastic member 3 outwardly. Simultaneously, pressurized fluid from the large fluid chamber 4 tends to be discharged into the small fluid chamber 6 through the main passageway 7 and the subpassageways 12 in the central member 11 fixed to the partition 5. In this embodiment, however, the fluid jetting obliquely from the subpassageways 12 into the small fluid chamber 6 collides against the inner surface of the diaphragm 8 or the partition 5 and whirls horizontally about the central axis of the main passageway 7; in other words, a vortex is generated around the main passageway 7. The vortex reduces the fluid pressure within the small fluid chamber 6, so that the difference in pressure between large and small fluid chambers increases and thus the flow of fluid through the main passageway 7 is increased markedly. Therefore, the fluid within the large fluid chamber 4 can smoothly transfer into the small fluid chamber 6 through the main passageway 7. In other words, the pressure built up within the large fluid chamber 4 is relieved via fluid discharge into the small fluid chamber 6 rather than by expanding the volume of the elastic member 3. In this case, the volume of the small fluid chamber 6 increases due to expansion of the diaphragm 8 outwardly according to the amount of fluid transferred from the large fluid chamber 4.

In the case where low-frequency vibrations are generated by the vehicle body so that the two frames 2a and 2b move in the direction of the axis of the elastic member 3 in extension mode, the side wall 3a of the elastic member 3 is lengthened, so that the volume within the large fluid chamber 4 increases and therefore the pressure within the large fluid chamber 4 drops below normal so that the elastic member 3 will deform inwardly. Simultaneously, the pressure within the small fluid chamber 6 tends to be relieved into the large fluid chamber 4 through the main passageway 7 and the subpassageways 12 in the central member 11 of the partition 5. In this embodiment, the fluid jetting obliquely from the subpassageways 12 into the large fluid chamber 4 collides against the inner surface of the elastic member 3 or the partition 5 and whirls horizontally about the central axis of the main passageway 7; in other words, a vortex is generated around the main passageway 7. The vortex further lowers the fluid pressure within the large fluid chamber 4 so that the difference in pressure between large and small fluid chambers further increases and thus the flow of fluid through the main passageway 7 increases markedly. Therefore, the fluid within the small fluid chamber 6 can smoothly transfer into the large fluid chamber 4 through the main passageway 7. In other words, the pressure drop within the large fluid chamber 4 is compensated by fluid flow from the small fluid chamber 6 rather than by contraction of the elastic member 3.

As depicted in FIGS. 3(B)-1 and 3(B)-2, since the subpassageways are arranged obliquely and radially symmetrically with respect to the central axis of the main passageway 7, the two passageway openings 12a-1 and 12b-1 generate a vortex within the small fluid chamber 6 around the main passagaway 7 when the fluid within the large fluid chamber 4 jets into the small fluid chamber 6, while the other two passageway openings 12a-2 and 12b-2 generate a vortex within the large fluid chamber 4 around the main passageway 7 when the fluid within the small fluid chamber 6 jets into the large fluid chamber 4. In this arrangement, a single, relatively large vortex can be generated around the main passageway 7.

As depicted in FIGS. 3(C)-1 and 3(C)-2, since the subpassageways are aligned radially with the center of the main passageway 7 therebetween, the single passageway opening 12b'-1 generates a vortex within the small fluid chamber 6 around the main passageway 7 when the fluid within the large fluid chamber 4 jets into the small fluid chamber 6, while the other single passageway opening 12a'-2 generates a vortex within the large fluid chamber 4 around the main passageway 7 when the fluid within the small fluid chamber 6 jets into the large fluid chamber 4. In this arrangement, a number of relatively small but strong vortexes can be generated around and near the main passageway 7.

In the first embodiment according to the present invention, two subpassageways have been described; however, it is of course possible to have a single or three or more passageways in the central member 11.

As described above, in the first embodiment according to the present invention, since at least one subpassageway is provided near the main passageway so as to generate vortexes (vacuum pressure) for urging the damping fluid from the large fluid chamber to the small fluid chamber or vice versa and avoiding distortion of the volume of the vibration damper, that is, of the elastic member, it is possible to increase the flow of fluid through the main passageway, that is, to effectively damp low-frequency vibrations, without increasing the diameter of the main passageway, that is, without changing the frequency at which the maximum damping effect is achieved.

Figure 4A:
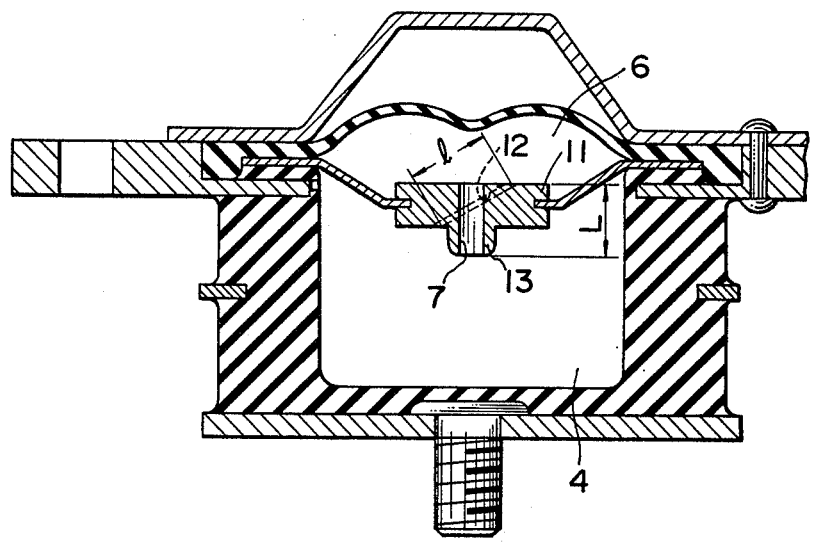
FIG. 4(A) is a cross-sectional view of a second embodiment of the vibration damper according to the present invention.
Figures 1, 4B:
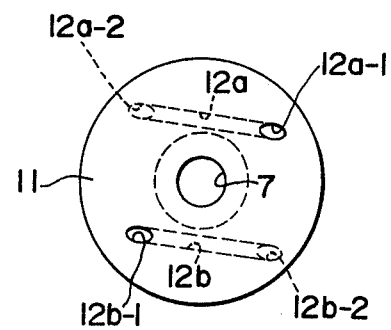
Figures 2, 4B:
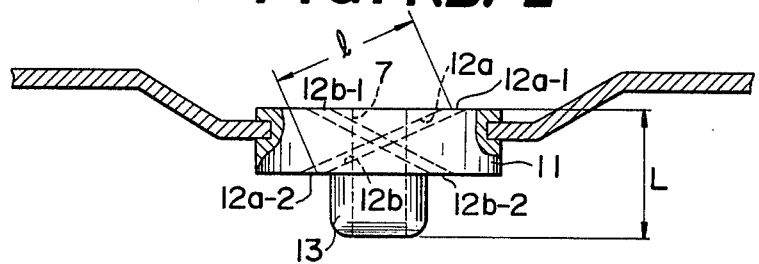
Figures 1, 4C:
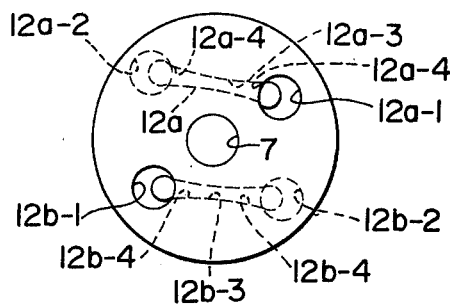
Figures 2, 4C:
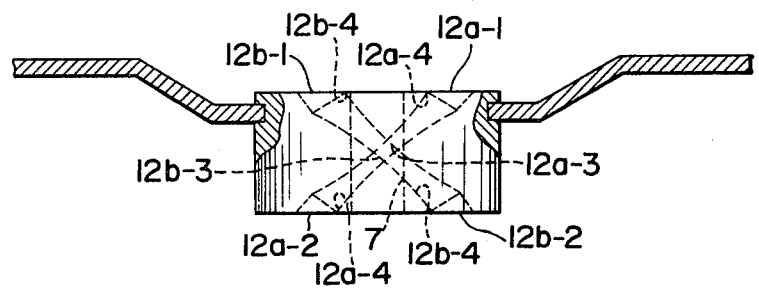

FIGS. 4(A), 4(B), and 4(C) show a second embodiment of the vibration damper according to the present invention, in which the mutual dimensions of the main and the subpassageways are also taken into consideration.

Figure 5:
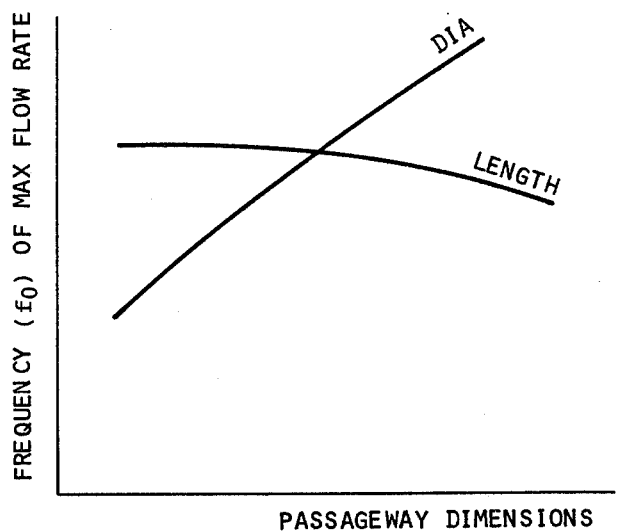
FIG. 5 is a graphical representation of the relationships between frequencies $f_o$ at which the flow rate is at its maximum and passageway dimensions, in which the curve (DIA) indicates the relationships between the frequencies $f_o$ and passageway diameters when passageway length is constant and the curve (LENGTH) indicates the relationships between the frequencies $f_o$ and passageway length when passageway diameter is constant.

Generally, when fluid flows through a passageway, resonant behavior prevails in which the amount of flow of the fluid passing through the passageway becomes at its maximum at a specific frequency $f_o$ which is determined by the hydraulic resistance and inertia at the passageway. As depicted in FIG. 5, frequency $f_o$ of the maximum flow rate (frequency at which the flow is maximized) increases with increasing diameter of the passageway as the length of the passageway is held constant and decreases with increasing length of the passageway as the diameter of the passageway is held constant. More specifically, the diameter of the passageway defines a hydraulic mean depth (cross-sectional area/wetted perimeter: D/4 in a circle) which is an important factor of hydraulic resistance. Generally, the less the hydraulic resistance (the greater the diameter of the passageway or the less the length of the passageway), the higher the frequency of the maximum flow rate. In the characteristics previously shown in FIG. 2, the peak points from No. 1 to No. 9 comprise the values at which the maximum loss factor is achieved because the flow of fluid through the passageway is maximized. In FIG. 2, for instance, when the diameter changes from 4 to 8 mm and the length is constant (5 mm), the peak value increases from 0.57 to 0.75 in loss factor and from 8 to 29 Hz in frequency; on the other hand, when the length changes from 5 to 15 mm and the diameter is constant (4 mm), the peak value increases from 0.57 to 0.68 in loss factor but decreases from 8 to 6 Hz in frequency.

Therefore, the object of the second embodiment of the vibration damper according to the present invention is to match the main passageway ($f_m$) to subpassageway ($f_s$) with respect to the frequency at which the maximum loss factor or the maximum flow rate can be obtained, in order to further increase the damping force.

Figure 6:
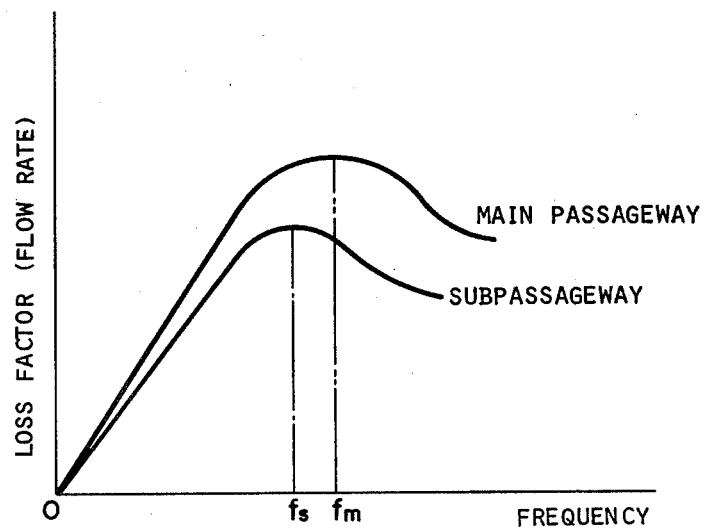
FIG. 6 is a graphical representation of the relationships between flow rates and vibration frequencies for both the main passageway and the subpassageway used with the first embodiment vibration damper shown in FIG. 3(A)
Figure 7:
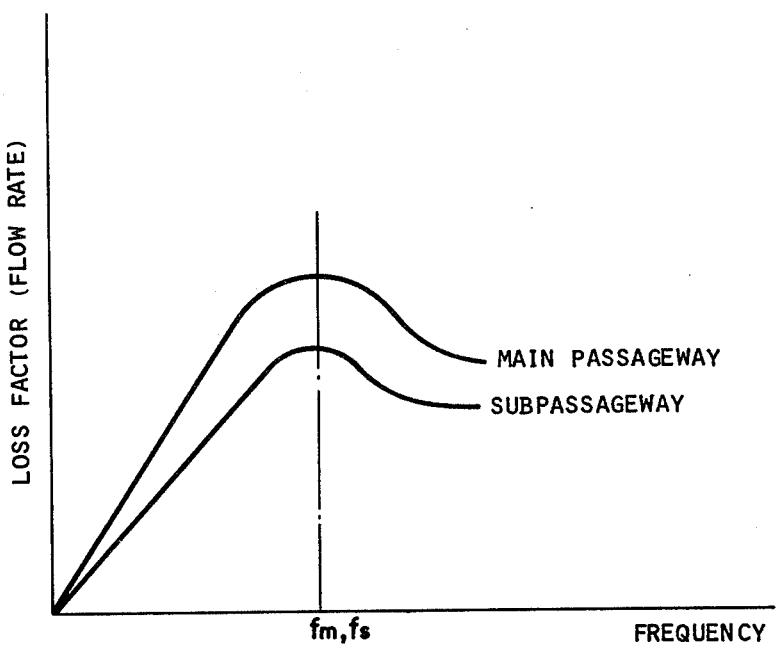
FIG. 7 is a graphical representation of the relationships between flow rates and vibration frequencies for both the main passageway and the subpassageway used with the second embodiment vibration damper shown in FIG. 4(A).

In more detail with reference to FIGS. 6 and 7, FIG. 6 shows the relationships between the loss factor and vibration frequency of the first embodiment. As indicated in this figure, since the diameter of the subpassageway is smaller than that of the main passageway and further since the length of the passageway is longer than that of the main passageway, the frequency $f_s$ of the maximum flow rate of the subpassageway is lower than that ($f_m$) of the main passageway. Therefore, in this embodiment, it is relatively difficult to effectively realize the damping force due to vortexes.

FIG. 7 shows the relationships between the loss factor and vibration frequency of the second embodiment. As depicted in this figure, since the diameter and the length of the subpassageways are adjusted, the frequency $f_s$ of the maximum flow rate of the subpassageway matches that ($f_m$) of the main passageway. Therefore, in this embodiment, it is possible to effectively realize the damping force due to vortexes. These two frequencies $f_m$ and $f_s$ at which the maximum flow rate or loss factor (damping force) can be obtained are preset to be within an appropriate vibration frequency range (from 10 to 20 Hz). Therefore, the flow of fluid through the subpassageway changes according to that of fluid flowing through the main passageway.

FIG. 4(A) corresponds to FIG. 3(A). In FIG. 4(A), the central member 11 has a central, concentric, convex portion 13 projecting toward the large fluid chamber 4. The main passageway 7 through the center of the central member 11 has total length (L) including the thicknesses of the central member 11 and the convex portion 13. The subpassageway 12 is formed obliquely with respect to the axis of the central member and does not penetrate the convex portion 13. Therefore, the length l of the subpassageway 12 is so formed as to be smaller than that (L) of the main passageway 7. That is to say, in the device of FIG. 4, the frequency of the maximum flow rate of the subpassageway 12 matches that of the main passageway 7 by virtue of this shortening of the length of the subpassageway 12.

FIGS. 4(B)-1 and 4(B)-2 correspond to FIGS. 3(B)-1 and 3(B)-2. The two passageways penetrate the central member 11 from bottom to top thereof without penetrating the convex portion 13 in such a way that the passageways are oblique to the axis of the central member 11 and are arranged radially symmetrically with respect to the center of the main passageway 7 on the plane perpendicular to the axis. In this embodiment, the frequency of the maximum flow rate of the subpassageways 12 matches that of the main passageway 7 due to the relative shortening of the length of the subpassageways 12.

In FIG. 4(B)-1, the two passageway openings 12a-1 and 12b-1 face the small fluid chamber and the two passageway openings 12a-2 and 12b-2 face the large fluid chamber.

FIGS. 4(C)-1 and 4(C)-2 correspond to FIGS. 3(B)-1 and 3(B)-2. In this embodiment, the respective subpassageways 12a and 12b are formed with a small diameter portion 12a-3 or 12b-3 at the middle portion thereof and two funnel-shaped large diameter portions 12a-4 or 12b-4 at either end of the middle portion thereof opening toward the opening portions 12a-1, 12a-2, 12b-1, and 12b-2, respectively. In this embodiment, the frequency of the maximum flow rate of the subpassageways 12 is matched to that of the main passageway 7 by increasing the hydraulic mean depth or the diameter, that is, by reducing the hydraulic resistance.

Figure 4D:
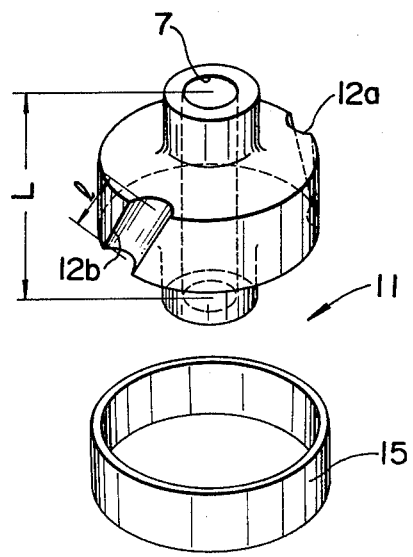
FIG. 4(D) is a perspective exploded view of another center member used with the second embodiment shown in FIG. 4(A)

FIG. 4(D) shows another embodiment of the main passageway and the subpassageways. In this embodiment, the central member 11 is a disk with a central tube projecting from both surfaces thereof. The main passageway 7 through the center of the central member 11 penetrates the disk portion via the central tube. Therefore, the length L of the main passageway matches the length of the tube. Two subpassageways 12a and 12b are formed at the outer periphery of the disk, as roughly semicircle-shaped grooves, oblique and concentrical with respect to the axis of the disk which form passageways in cooperation with an annular member 15 fitted to the disk.

Therefore, the length l of the subpassageway is roughly the thickness of the disk. In this embodiment, the frequency of the maximum flow rate of the subpassageways 12 is matched to that of the main passageway 7 by shortening the subpassageways 12.

Further, in this embodiment, since the subpassageways are formed on and along an outer circumference of the disk, when fluid passes through the subpassageways, vortexes can be readily generated about the axis of the main passageway 7.

The vibration damper according to the present invention has mainly been described with respect to its application to an engine mounting device used for an automotive vehicle; however, it is of course possible to apply the vibration damper according to the present invention to a general vibration damper disposed between a vibrating member and a vibrated member in order to damp high- and low-frequency vibrations at the same time.

As described above, in the vibration damper according to the present invention in which there is at least one subpassageway near the main passageway oblique to the axis of the main passageway, since vortexes are produced around the main passageway by fluid flowing through the subpassageway and subnormal pressure is induced by the vortexes, it is possible to increase the flow of fluid through the main passageway in order to smoothly balance the difference in pressure between large and small chambers, thereby avoiding distortion of the elastic member. Therefore, it is possible to select the material for the elastic member to be as soft as possible for the purpose of damping only high-frequency vibrations, while improving the damping effect of the fluid for the purpose of damping only low-frequency vibrations.

Furthermore, as described above, since the dimensions of the main passageway and the subpassageway are so determined that the maximum flow rate through the main passageway and the maximum flow rate through the subpassageway are obtained at the same frequency range within which low frequency vibrations are required to be damped, it is possible to further improve the damping effect of the fluid at the required frequency range.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A vibration damper for preventing transmission of vibrations between two independently supported members, which comprises:
    (a) two independent frames, one of which is fixed to one member and the other of which is fixed to the other member;
    (b) an elastic member disposed between said two frames and fixed to said two frames;
    (c) a diaphragm fixed to said elastic member to define a fluid chamber filled up with a viscous damping fluid; and
    (d) a partition disposed within the fluid chamber to divide the fluid chamber into a large fluid chamber and a small fluid chamber, said partition being provided with:
       (1) a main passageway communicating between the large and small fluid chambers in the direction of the axis of said elastic member at the center of said partition; and
       (2) at least one subpassageway communicating between the large and small fluid chambers in the direction oblique to the axis of said elastic member near the main passageway, whereby vortexes can be produced due to the flow of the fluid passing through the subpassageway near the main passageway in order to smoothly transfer the viscous damping fluid from the large fluid chamber to the small fluid chamber or vice versa when said elastic member deforms, so that viscous damping force is further exerted to the vibration damper.

2. A vibration damper for preventing transmission of vibrations between two independently supported members as set forth in claim 1, wherein said partition is provided with a pair of two subpassageways penetrating said partition from one surface to the other surface in such a way that the passageways are oblique to the axis of said elastic member and arranged radially symmetrically with respect to the center of the main passageway on any plane through the partition and perpendicular to the axis of said elastic member.

3. A vibration damper for preventing transmission of vibrations between two independently supported members as set forth in claim 1, wherein said partition is provided with a pair of two subpassageways penetrating said partition from one surface to the other surface in such a way that the passageways are oblique to the axis of said elastic member, diametrically opposed, and parallel to each other.

4. A vibration damper for preventing transmission of vibrations between two independently supported members as set forth in claim 1, wherein the dimensions of said main passageway and said subpassageway are determined in such a way that the vibration frequency at which the amount of flow of the fluid passed through the main passageway becomes at its maximum matches with the vibration frequency at which the amount of flow of the fluid passed through the subpassageway becomes at its maximum.

5. A vibration damper for preventing transmission of vibrations between two independently supported members as set forth in claim 4, wherein the subpassageways have a diameter smaller than that of the main passageway and a length smaller than that of the main passageway.

6. A vibration damper for preventing transmission of vibrations between two independently supported members as set forth in claim 4, wherein the subpassageways have a diameter greater than that of the main passageway and a length greater than that of the main passageway.

7. A vibration damper for preventing transmission of vibrations between two independently supported members as set forth in claim 6, wherein the subpassageways flare at either end to increase the mean diameter thereof.

8. A vibration damper for preventing transmission of vibrations between two independently supported members, which comprises:
 (a) two independent frames, one of which is fixed to one member and the other of which is fixed to the other member;
 (b) an elastic member disposed between said two frames and fixed to said two frames;
 (c) a diaphragm fixed to said elastic member to define a fluid chamber filled up with a viscous damping fluid;
 (d) a partition disposed within the fluid chamber to divide the fluid chamber into a large fluid chamber and a small fluid chamber;
 (e) an annular member fixed to the center of said partition; and
 (f) a disk with a central tube projecting from both surfaces thereof, said disk fitted to the inner circumferential surface of said annular member, said disk being provided with a main passageway penetrating the projecting central tubes and at least one roughly semicircular subpassageway formed in cooperation with said annular member, the passageway of which is a recess arranged along the edge of said disk and oblique to the axis of said disk, so that the subpassageways are defined by said annular member and the recesses of said disk.

* * * * *